United States Patent
Raue et al.

(12) 
(10) Patent No.: US 6,194,537 B1
(45) Date of Patent: Feb. 27, 2001

(54) NYLON 6 CHIP AND PRODUCTION OF NYLON 6 YARN AND FILM AND OF FURTHER INDUSTRIAL ARTICLES FROM NYLON 6

(75) Inventors: Eberhard Raue, Schoenfliess; Reiner Hagen, Berlin, both of (DE)

(73) Assignee: Karl Fischer Industrieanlagen GmbH (DE)

( * ) Notice: Subject to any disclaimer, the term of this patent is extended or adjusted under 35 U.S.C. 154(b) by 0 days.

(21) Appl. No.: 09/231,312

(22) Filed: Jan. 13, 1999

(30) Foreign Application Priority Data

Jan. 15, 1998 (DE) ................................ 198 01 267

(51) Int. Cl.$^7$ ................ C08G 69/14; C08G 69/16
(52) U.S. Cl. .............. 528/310; 528/312; 528/323; 528/326; 528/336; 528/480; 528/499
(58) Field of Search ................... 528/312, 310, 528/326, 323, 480, 336, 499

(56) References Cited

U.S. PATENT DOCUMENTS

| 3,386,967 |   | 6/1968  | Twilley .         |         |
|-----------|---|---------|-------------------|---------|
| 4,978,743 | * | 12/1990 | Selbeck et al.    | 528/499 |
| 5,218,080 | * | 6/1993  | Dellinger         | 528/323 |
| 5,597,888 | * | 1/1997  | Nielinger et al.  | 528/335 |
| 5,674,973 | * | 10/1997 | Pipper et al.     | 528/323 |
| 5,703,204 | * | 12/1997 | Gittinger et al.  | 528/486 |
| 5,773,555 | * | 6/1998  | Weger et al.      | 528/310 |
| 5,973,105 | * | 10/1999 | Wiltzer et al.    | 528/323 |

FOREIGN PATENT DOCUMENTS 40 19 780 A1    1/1992    (DE) .

* cited by examiner

*Primary Examiner*—P. Hampton-Hightower
(74) *Attorney, Agent, or Firm*—Marshall & Melhorn

(57) ABSTRACT

Nylon 6 chip is obtainable by hydrolytic polymerization of caprolactam in the presence of dicarboxylic acids as chain regulators, subsequent processing of the polymer melt into chip, extraction of the low molecular weight portions from the chip with water and subsequent drying of the chip.

7 Claims, 1 Drawing Sheet

NYLON 6 CHIP AND PRODUCTION OF NYLON 6 YARN AND FILM AND OF FURTHER INDUSTRIAL ARTICLES FROM NYLON 6

BACKGROUND OF THE INVENTION

Prior art for making nylon 6 on the basis of caprolactam is a process employing mono- or bifunctional carboxylic acids or amines as chain regulators. It has further been known for a long time to use chain regulators based on dicarboxylic acids (cf. U.S. Pat. No. 3,386,967 and DE Pat. No. 4,019,780).

In this known process, reaction partners are caprolactam, water as initiator and the abovementioned chain regulators. Additives such as, for example, pigments (TiO$_2$ or others), light stabilizers or heat stabilizers may be included for specific applications. A characteristic feature of caprolactam polymerization is the formation of a reaction equilibrium. As well as the polymer, the melt includes about 10% of monomer (caprolactam) and cyclic oligomers. These low molecular weight constituents are dissolved out during chipmaking by an extraction with hot water. The extract water, which has an extractables concentration of up to 16%, depending on process specification, is generally concentrated by evaporation and the lactam separated from the oligomers by distillation. The oligomers are either removed from the process or depolymerized back to lactam. Lactam distillation and depolymerization are extremely energy-intensive.

The direct recycling of the concentrated extract water into the polymerization stage has hitherto been avoided for high grade applications of nylon 6 chip such as textile yarn or industrial yarn of high strength or film. The reason for this is the reduced quality such as reduced strength in the case of yarn or defective areas in film. Moreover, the spinning process is adversely affected by more broken ends and shorter spinning filter surface lives.

The underlying cause of these problems is in particular that the concentration of the cyclic oligomers of polycaprolactam, especially cyclic dimer, increases in the nylon 6 chip compared with nylon 6 chip produced without recycling of the concentrated extract water. The cyclic diner is particularly disadvantageous, since it has a very high melting point of 348° C., which is far above the melting point of nylon 6 (220° C.), and since it is partly present in the polymer melt in the form of undissolved particles or will rise to the surface in this form in the course of the processing into film and yarn and so cause yarn breakages or film defects.

SUMMARY OF THE INVENTION

It is an object of the present invention to provide nylon 6 chip which has been obtained by recycling the extract water and which makes it possible to produce products such as, for example, yarn or film without loss of quality.

This object is achieved with regard to nylon 6 chip by the defining features of claim 1, with regard to yarn produced with this chip by the features of claim 9 and with regard to film by the features of claim 18. The subclaims present advantageous further developments.

The nylon 6 chip of the invention is accordingly produced by the extract water being returned into the polymerization process only after admixing with fresh lactam and subsequent concentrating. It is a particularly favorable aspect of the product of the invention that the cyclic dimer content following the extraction with water is less than 0.1% by weight in the polycaprolactam.

It has been found that the addition of dicarboxylic acids is indispensible. This group of substances act as chain length stabilizers. However, compared with monocarboxylic acids which perform the same function, dicarboxylic acids have the advantage in the case of extract water recycling of leading to a lower level of cyclic oligomer in the chip after polymerization. This low level persists throughout the extraction and drying stage into the chip for further processing. In the case of nylon 6 chip produced with the addition of dicarboxylic acids in the polymerization, the problems hitherto observed in further processing or in the end product when recycling the extract water can accordingly be avoided.

An essential aspect of the nylon 6 chip of the invention is that the reaction components are selected and combined in a specific optimum manner for the production process.

The extract water, which leaves the extractor enriched with lactam and oligomer to a concentration of up to 16%, is according to the invention gently concentrated in an evaporator, preferably in a multistage evaporator under reduced pressure. After evaporation, the extract concentration should be 75 to 95% by weight. To prevent oligomer precipitating out of the solution during the evaporation process, fresh lactam is added to the extract water prior to evaporation. The mixing ratio selected for admixing to the extract water is such that there will be at least 1 kg of fresh lactam per 1 kg of water-free extract. The proportion of fresh lactam added thus corresponds to the dissolved extractables (lactam plus oligomer), in the range from 1.0 to 2.0. A further favorable measure to prevent the precipitation of cyclic oligomer from the extract water even better is to maintain a minimum temperature of 80° until the solution is mixed with fresh lactam. These conditions ensure that partial precipitation of cyclic oligomer is prevented and the solution is storable. It is important for optimal polymer quality that this precipitation is prevented.

The temperature during evaporation of the extract water should not be more than 120°. The reaction mixture for the polymerization can have a concentration of 0.1 to 3% by weight of cyclic dimer and a water content between 0.8 and 6.0% by weight.

In another embodiment to produce the nylon 6 chip of the invention, the concentrated extract water from a plurality of process lines is combined before or after admixture with fresh lactam and this mixture is fed into the polymerization stage of a single process line and in this case too the concentration of cyclic dimer is less than 1% by weight on completion of the polymerization. This allows a particularly economical form of processing.

Suitable dicarboxylic acids include C3 to C12 alkanedicarboxylic acids, e.g., adipic acid, cycloaliphatic dicarboxylic acids having 5 to 14 carbon atoms and/or aromatic dicarboxylic acids having 8 to 14 carbon atoms, for example naphthalenedicarboxylic acids, terephthalic acid or isophthalic acid. Preference is given to using terephthalic acid as chain regulator in the range from 0.08 to 0.6% by weight depending on the desired intended purpose of the nylon 6.

The invention further provides nylon 6 yarn produced using a chip as described above.

In the process of the invention, dried chip is conventionally melted in an extruder and the melt is then forced through spinneret holes. The molten filaments are air quenched and solidified and specifically drawn and wound up by means of take-off elements. The chip of the invention makes it possible in principle to achieve yarn speeds within the range from 500 to 6,000 m/min, between spinneret and first take-off element. It is particularly preferable here to use the nylon 6 chip to produce textile yarn within the conventional spinning range from 600 to 1,200 m/min.

This invention, however, also includes speed ranges of high speed spinning (including the possibility of direct further processing in a process line) within the speed range from 3,500 to 6,000 m/min. Similarly, the chip of the invention permits the spinning of BCF yarn in the speed range from 600 to 2,000 m/min and the spinning of industrial yarn and of tire cord in the speed range from 500 to 1,200 m/min up to the first godet with direct further processing in one processing step. The process of the invention is thus particularly useful for the following yarn:

textile yarn in the conventional spinning process (up to 1,200 m/min), textile yarn by the high speed spinning process (POY) and in combination with subsequent drawing in the same process (FDY), industrial yarn and tire cord in the conventional process and in the spin-draw process, and BCF yarn in the spin-draw-texturing process.

Nylon 6 chip of the invention makes it possible to produce not only nylon 6 filament but also film and other industrial articles from nylon.

The nylon 6 of the invention can be produced batchwise or in a stirred autoclave and also continuously in a VK-tube. The polymerization in a VK-tube can be carried out in one or two stages.

The polymerization is carried out with the following essential reaction components (other additives can be added for specific applications):

Fresh lactam in the molten state,

Concentrated extract water comprising lactam, oligomers and water, and

Chain regulators comprising bifunctionally acting dicarboxylic acids which are thermally stable under the polymerization conditions.

Suitable dicarboxylic acids are:

C4 to C10 alkanedicarboxylic acids, e.g. adipic acid,

C5 to C8 cycloalkanedicarboxylic acids, and benzene- and naphthalenecarboxylic acids, e.g. terephthalic acid or isophthalic acid.

Preference is given to terephthalic acid as chain regulator in the range of 0.08–0.6% by weight depending on the intended purpose of the nylon 6.

The reaction mixture prior to entry into the reaction reactor includes (based on lactam)

2 to 8% of oligomers 1 to 6% of water.

DESCRIPTION OF THE DRAWING

The advantages of the invention will become readily apparent to those skilled in the art from the following detailed description of a preferred embodiment when considered in the light of the accompanying drawing, in which.

DESCRIPTION OF THE PREFERRED EMBODIMENT

Figure 1:
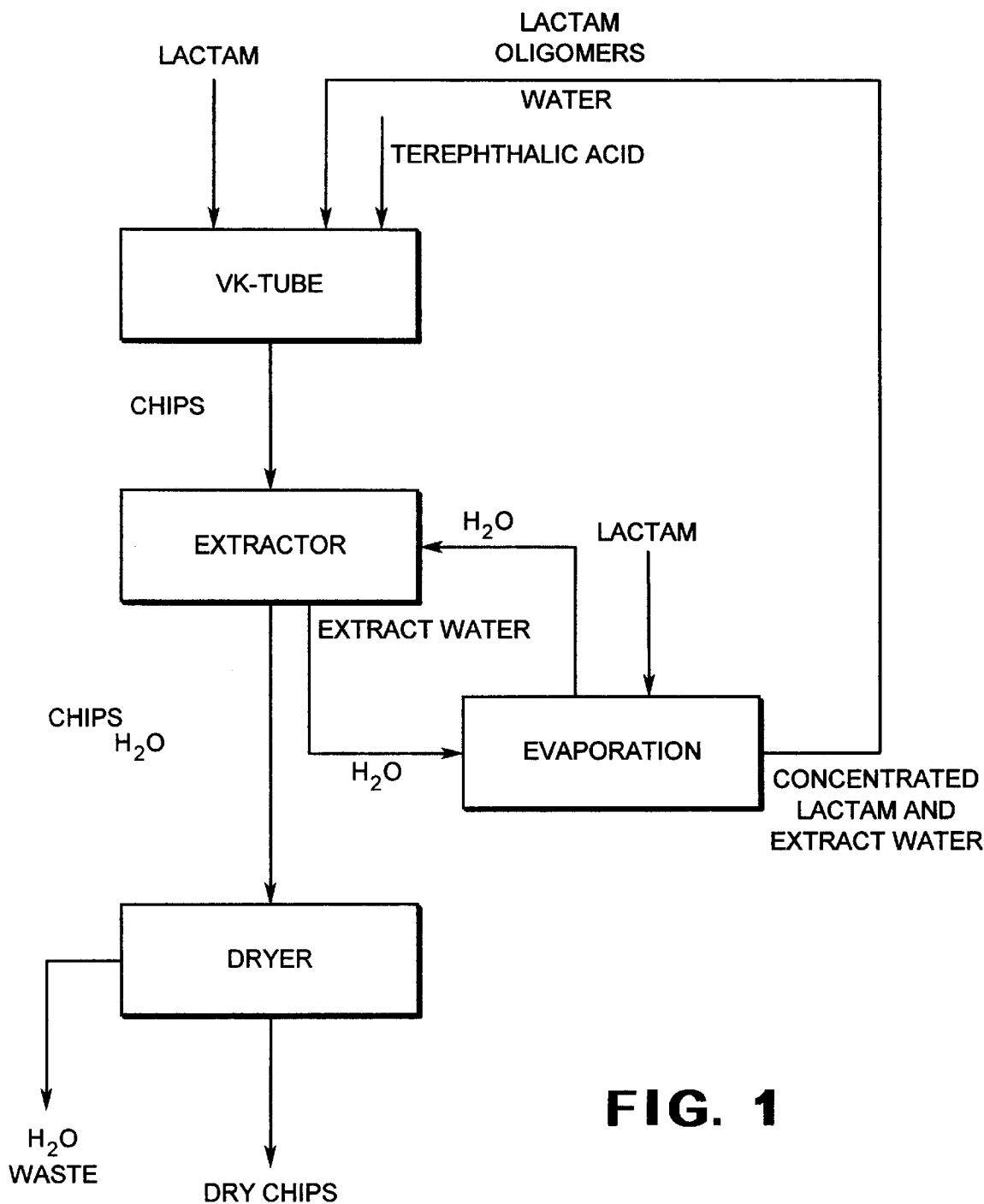
FIG. 1 is a flow diagram of the process in accordance with the invention.

The continuous polymerization as a one-stage process (FIG. 1) is carried out under a constant pressure (measured in the gas space of the reactor above the melt level) of 1.0 to 1.5 bar. In the case of the two-stage process, the overpressure in the first stage is 1 to 5 bar. The second stage is operated in the absolute pressure range from 0.5 to 1.5 bar. The two-stage process leads to a particularly low level of cyclic dimer in the polymer after polymerization and hot water extraction. This is due to the higher pressure in the first stage, which leads to a higher water content in the reaction melt. The higher water content favors the degradation of cyclic oligomers.

The water content in the melt is set within the range from 0.1 to 0.4% by weight through appropriate tempering of the reactor(s), setting the final RV viscosity accordingly. The polymerization temperatures are maintained within the range from 230 to 280° C.

The excess water is distilled off continuously. The reaction times range from 12 to 20 h in the case of the one-stage process and from 7 to 14 h in the case of the two-stage process.

The extract water, which leaves the extractor enriched to a lactam and oligomer concentration of up to 16%, is gently evaporated under reduced pressure in a multistage evaporator. After evaporation, the extract concentration is 75 to 95% by weight.

To prevent oligomers from precipitating from the solution during evaporation, the extract water is admixed with fresh lactam prior to evaporation. The amount of fresh lactam added corresponds to the dissolved extractables (lactam plus oligomers) within the range from 1.0 to 2.0.

The production of the nylon 6 chip of the invention will now be described by way of example.

Inventive Example 1

A VK-tube (melt volume 180 l) was continuously fed with a reaction mixture consisting of:

94% by weight of lactam,

3% by weight of cyclic dimer,

3% by weight of water, and also 0.5% by weight of terephthalic acid based on lactam.

The pressure above the melt was 1.04 bar. The temperature of the melt in the uppermost reaction zone was set to 250° C. Owing to the heat of reaction, the temperature of the melt rose to 275° C. and was cooled back down to 250° C. in the last third of the reactor. The concentration of cyclic dimer in the polymer prior to extraction was 0.96%, measured by HPLC. Following hot water extraction and drying in a tumble dryer, the relative viscosity was 2.42, the water content 0.06% and the cyclic dimer content 0.09%.

The reaction time in the VK-tube was 13 h.

Inventive Example 2

A stirred pressure tank (as reaction stage 1) continuously charged with:

94% by weight of lactam,

3% by weight of cyclic dimer,

3% by weight of water, and also 0.1% by weight of terephthalic acid.

The reaction temperature was set to 240° C. and a pressure of 2 bar absolute was maintained in the gas space. The excess water was distilled off. The prepolymer was fed into a second reaction stage (VK-tube), decompressed therein to 1.04 bar (absolute) and further polymerized in the uppermost reaction zone at a temperature of 270° C. The temperature of the melt in the VK-tube was maintained at 270° C.

The total reaction time in the two stages was 10 h. The concentration of cyclic dimer in the polymer was 0.83% measured by HPLC. After hot water extraction and drying in a tumble dryer with partial solid state postcondensation, the relative viscosity was 3.25 and the water content after conditioning 0.05% and the cyclic dimer content 0.05%. A copper-based heat stabilizer was applied during drying.

The nylon 6 chip produced in Invention Examples 1 and 2 was spun in a pilot scale spinning plant.

Nylon 6 chip representing the prior art and having a higher viscosity was spun for comparison under the same conditions after first likewise having the same heat stabilizer applied to it.

The pilot scale spinning plant used had the following construction:
1. Spinning plant for textile high speed spinning
    Extruder from Reifenhäuser, type RH 121
    Spinning head ESK 258B from Karl Fischer with 12 hole jets (hole diameter: 0.25 mm, capillary length: 0.50 mm)
    Winder from Bamag SW 46-1 S 600
    Transverse quench between spinneret and spin finisher
2. Spinning plant for tire cord
    Extruder from Reifenhauser, type RH 121 with screw AG 942
    Spinning head HSK 400 with afterheater from Karl Fischer with spinneret Ø140, hole diameter: 0.3 mm, capillary diameter 0.6 mm
    Radial quench chamber from Karl Fischer
    Spin-draw-wind machine from Rieter, type J 3/1, J 2 A5

Inventive Example 3

The nylon 6 chip produced in Inventive Example 1 was spun with the above-described spinning plant for textile high speed spinning. After optimization had taken place, 300 kg were spun with stable settings. The spinning speed was 4,500 m/min. The 12 filament yarn spun had an as-spun linear density of 64.8 den. The POY bobbins were tested in respect of breaking strength and breaking extension and later draw-extruded with a Rieter-Scragg draw-texturing machine DCS 1200 (draw ratio 1.283, winding speed 683 m/min).

Comparative Example 1

The same spinning means and the same settings were used to spin a commercially available nylon 6 chip (Ultramid BS 400 D2 having an RV viscosity of 2.43 (again a comparable 300 kg). The POY yarn produced was tested and then textured with the same draw-texturing machine and the same setting as in Inventive Example 3.

Inventive Example 4

The chip produced in Inventive Example 2 was spun with the above-described spinning plant for tire cord (300 kg with stable settings after optimization had taken place).

The spinning speed (between jet and first godet) was 585 m/min. The draw ratio applied was 4.793 and the yarn was wound up at 2,726 m/min.

The yarn was tested after 8 h of conditioning at 22° C. and 65% relative humidity.

Comparative Example 2

Using the same spinning means as in Inventive Example 4, commercially available nylon 6 chip (Ultramid BS 3.300 having a viscosity of 3.20) was spun (again comparable 300 kg). The same machine settings as in Inventive Example 4 produced extremely high yarn breakage rates (virtually no full packages were possible). The machine settings were therefore changed as follows:
    Spinning speed (between jet and first godet) 600 m/min
    Draw ratio 4.64 and winding speed 2,734 m/min.
All the other parameters were the same as in the spinning trial of Inventive Example 4.

TABLE 1 with Inventive Example 3 and Comparative Example 1

|  | Inv. Ex. 3 | Comp. Ex. 1 |
|---|---|---|
| Take-off speed POY breaking strength [g/den] | 4.95 | 4.77 |
| POY breaking extension [%] | 68.1 | 69.1 |
| Draw-textured yarn breaking strength [g/den] | 5.15 | 4.97 |
| Full package yield POY (8 kg) [%] | 100 | 95 |
| Full package yield on draw-texturing (2 kg) [%] | 95 | 90 |

It can be seen that the breaking strength and the full package yields in Inventive Example 3 are higher than in Comparative Example 1 employing prior art chip.

TABLE 2 with Inventive Example 4 and Comparative Example 2

|  | Inv. Ex. 4 | Comp. Ex. 2 |
|---|---|---|
| Spinning speed [m/min] | 585 | 600 |
| Draw ratio | 4.793 | 4.64 |
| Winding speed [m/min] | 2726 | 2734 |
| Breaking strength [CN/dtex] | 8.46 | 8.05 |
| Breaking extension [%] | 19.9 | 18.9 |
| Full package yield [%] (6 kg) | 100 | 90 |

The table shows that Inventive Example 4 could be operated at a higher draw ratio and produced a higher breaking strength and that the breaking extension was somewhat higher. The full package yield of Inventive Example 4 was higher.

What is claimed is:

1. Nylon 6 chip having a relative viscosity (measured at 25° C. on a solution of 1 g of nylon 6 in 100 ml of 96% strength sulfuric acid) of 2.2 to 4.8, formed from hydrolytic polymerization of caprolactam in the presence of dicarboxylic acids as chain regulators, subsequent processing of the polymer melt into chip, extraction of the low molecular weight fractions from the chip with water and subsequent drying of the chip, which comprises, the temperature at which the extract water is evaporated does not exceed 120° C. the extract water from the extraction of the chip, comprising a mixture of caprolactam and its oligomers, being admixed with fresh lactam and then concentrated through evaporation of the water content and the concentrate being recycled into the polymerization and the concentration of the cyclic dimer being less than 1% by weight after the polymerization has ended, wherein the continuous polymerization is carried out without application of pressure in a closed system.

2. The nylon 6 chip of claim 1, wherefor the post-evaporation caprolactam concentration is within the range from 75 to 95% by weight.

3. The nylon 6 chip of claim 1, wherefor the temperature of the extract water prior to mixing with fresh lactam is more than 80° C.

4. The nylon 6 chip of claim 1, wherefor the mixing ratio for admixing to the extract water is such that there is at least 1 kg of fresh lactam per 1 kg of water-free extract.

5. The nylon 6 chip of claim 1, wherefor the reaction mixture for the, polymerization has a concentration of 0.1 to 3% by weight of cyclic dimer and a water content between 0.8 and 6.0% by weight.

6. The nylon 6 chip of claim 1, wherefor the concentrated extract water from a plurality of process lines is combined before or after admixture with fresh lactam and this mixture is fed into the polymerization stage of a single process line, and in this case too the concentration of cyclic dimer is less than 1% by weight on completion of the polymerization.

7. The nylon 6 chip of claim 1, wherefor the dicarboxylic acids used are straight- or branched-chain alkanedicarboxylic acids having 3 to 12 carbon atoms, cycloaliphatic dicarboxylic acids having 5 to 14 carbon atoms or aromatic dicarboxylic acids having 8 to 14 carbon atoms.

* * * * *